United States Patent
Rejc et al.

(10) Patent No.: US 9,487,069 B2
(45) Date of Patent: Nov. 8, 2016

(54) LIFTGATE DIE CAST INNER PANEL SUB-ASSEMBLY

(71) Applicants: Scott W Rejc, Highland, MI (US); Clifford L Eberle, Jr., Clarkson, MI (US)

(72) Inventors: Scott W Rejc, Highland, MI (US); Clifford L Eberle, Jr., Clarkson, MI (US)

(73) Assignee: FCA US LLC, Auburn Hills, MI (US)

(*) Notice: Subject to any disclaimer, the term of this patent is extended or adjusted under 35 U.S.C. 154(b) by 63 days.

(21) Appl. No.: 14/577,290

(22) Filed: Dec. 19, 2014

(65) Prior Publication Data
US 2016/0176272 A1    Jun. 23, 2016

(51) Int. Cl.
*B60J 5/10*   (2006.01)
*B60L 9/00*   (2006.01)
*B60Q 1/00*   (2006.01)
*B60J 5/04*   (2006.01)

(52) U.S. Cl.
CPC ............... *B60J 5/107* (2013.01); *B60J 5/0483* (2013.01); *B60L 9/00* (2013.01); *B60Q 1/0035* (2013.01)

(58) Field of Classification Search
CPC .......... B60J 5/107; B60J 9/00; B60Q 1/0035
USPC ....... 296/146.8, 146.6, 186.3, 190.11, 193.8, 296/56
See application file for complete search history.

(56) References Cited

U.S. PATENT DOCUMENTS

| | | | | |
|---|---|---|---|---|
| 4,799,730 A * | 1/1989 | Harasaki | ................ | B60H 1/248 296/146.8 |
| 6,039,389 A * | 3/2000 | Monette | ................... | B60J 5/101 296/207 |
| 7,125,067 B2 * | 10/2006 | Bonnett | ................. | B60J 5/0416 296/146.5 |
| 7,618,083 B2 * | 11/2009 | Munenaga | ............... | B60J 5/101 296/146.5 |
| 7,832,791 B2 * | 11/2010 | Wojcik | ..................... | B60J 5/101 15/250.3 |
| 8,418,408 B2 * | 4/2013 | Yasuhara | ............... | B60J 5/0426 296/146.6 |
| D718,695 S | 12/2014 | Galante et al. | | |
| 2011/0025094 A1 * | 2/2011 | Eipper | .................. | B22D 19/04 296/187.01 |
| 2013/0020822 A1 | 1/2013 | Inoue et al. | | |
| 2014/0028058 A1 * | 1/2014 | Mochizuki | ............. | B62D 25/08 296/193.08 |

FOREIGN PATENT DOCUMENTS

| | | |
|---|---|---|
| EP | 2020321 A1 | 2/2009 |
| EP | 2384917 A1 | 11/2011 |
| JP | H10278689 | 10/1998 |
| JP | 2001328429 A | 11/2001 |

OTHER PUBLICATIONS

International Search Report and Written Opinion dated Mar. 31, 2016 for International Application No. PCT/US2015/066011, International Filing Date Dec. 16, 2015.

* cited by examiner

*Primary Examiner* — Jason S. Morrow
*Assistant Examiner* — E Turner Hicks
(74) *Attorney, Agent, or Firm* — Ralph E. Smith

(57) ABSTRACT

A vehicle liftgate includes a die-cast inner panel and an outer header panel. The inner panel includes a header member, a pair of supports, a lower section, and at least one stiffener. The header member has a top edge and a bottom edge. The supports couple the header to the lower section. The supports and the bottom edge of the header member partially define a window aperture. The stiffener is coupled to the header member between the top and bottom edges and between opposite ends of the header member. The outer header panel is mounted to the header member to define a header cavity between the header member and the outer header panel. The stiffener protrudes from the header member into the header cavity and is fixed to the outer header panel.

19 Claims, 10 Drawing Sheets

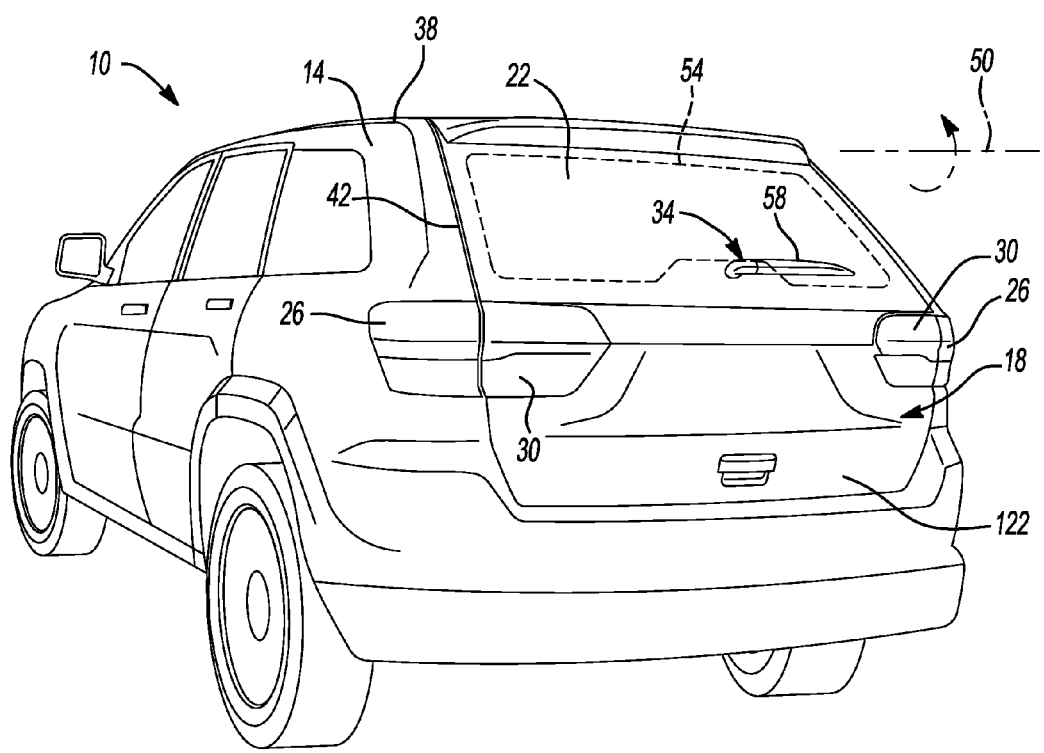
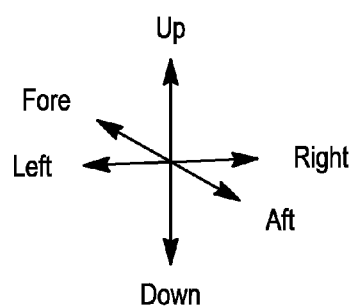
Fig-1

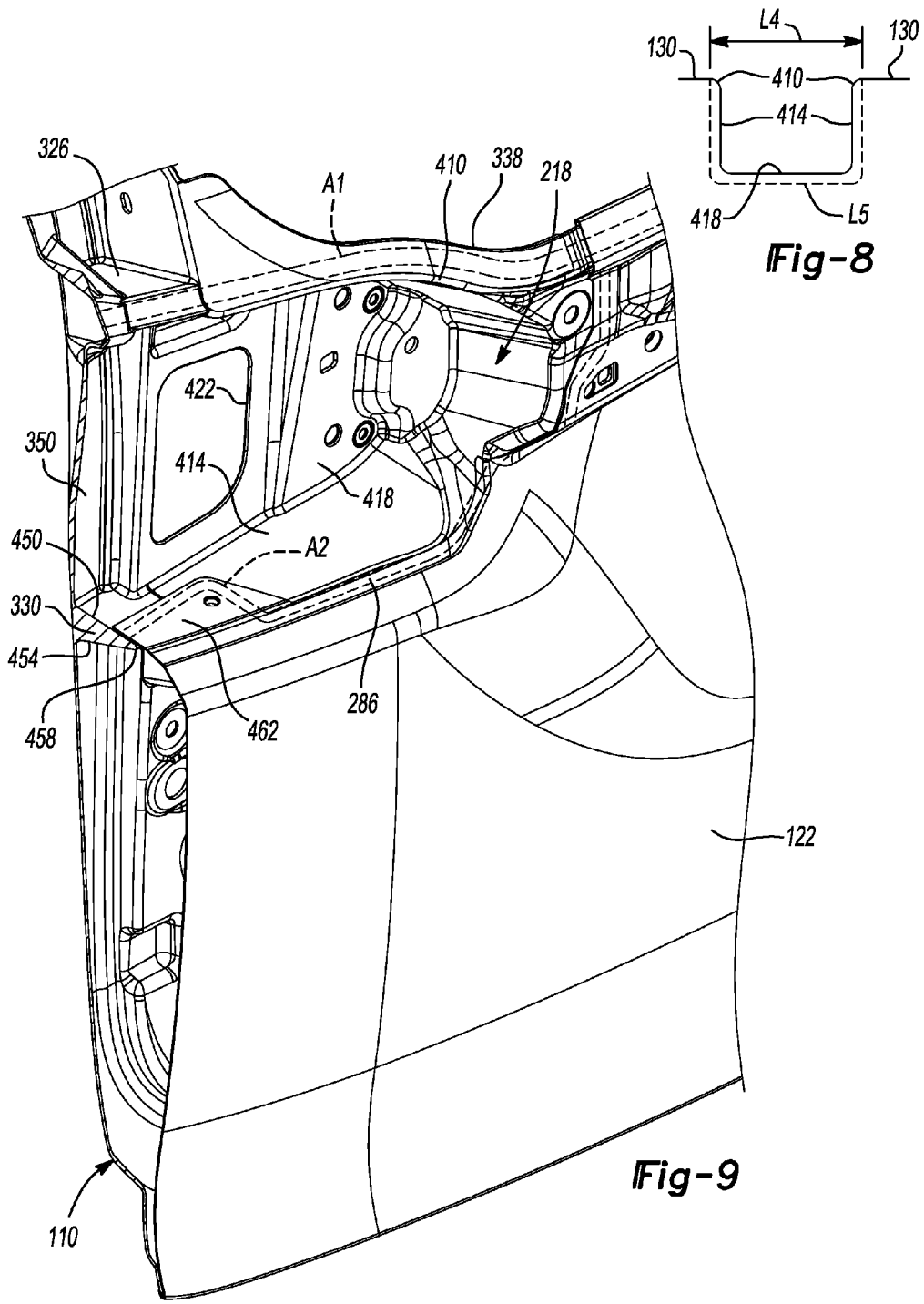

LIFTGATE DIE CAST INNER PANEL SUB-ASSEMBLY

The present disclosure relates to vehicle liftgates having die cast inner panels.

BACKGROUND

This section provides background information related to the present disclosure and is not necessarily prior art.

Vehicles that have flip-up style rear doors (i.e. liftgates), such as SUVs, vans, or hatchbacks for example, are typical constructed with an inner panel disposed toward an interior side of the vehicle, an outer panel disposed toward an exterior side of the vehicle, and a window pane disposed in an upper section of the liftgate. The inner panel is typically stamped or pressed from a single sheet of metal, such as steel or aluminum, into a shape that generally contours to an opening to the rear of the passenger compartment or trunk area of the vehicle. The shape of conventional inner panels includes a large, generally rectangular opening for the rear window in the upper section of the inner panel. The liftgate is typically hinged to the vehicle structure, such as at a header of a vehicle body, to allow pivotal movement of the liftgate to open the liftgate. The liftgate and vehicle body typically include a latching mechanism to secure the liftgate to the vehicle body when closed. Conventionally constructed liftgates pose a number of issues that are improved upon by the present teachings.

Conventional liftgates contribute significantly to the overall weight of the vehicle. With increasing demand for greater fuel economy, reducing the weight of the liftgate is one target for increasing fuel economy. One method of reducing the weight of the liftgate is to cast the inner panel from a lighter material, such as magnesium for example, instead of press molding or stamping it from steel or aluminum. Magnesium casting is a relatively new method in the art of vehicle liftgates, and due to the size and complexity of liftgates relative to conventionally die cast parts, it raises many new challenges. The size of the rear window pane is also a significant target for reducing the weight of the liftgate. However, the sprue and gates of the casting die and platen are typically located within the envelope of the rear window opening. Decreasing the size of the inner panel's rear window opening reduces the area available for introducing the molten magnesium into the mold through the sprue and gates. Decreasing the size of the rear window opening also increases the size of the liftgate's lower section (i.e. the area below the rear window opening). The larger the lower section of the inner panel, the further that the molten magnesium must travel through the casting mold to reach the outer periphery of the inner panel. Long travel distances can cause the molten metal to cool and begin to solidify before reaching all portions of the mold. This cooling can prevent adequate flow through narrower areas of the mold, thus effectively limiting the minimum nominal thickness of the inner panel, and thus the minimum weight achievable.

Conventionally constructed liftgates can vibrate and move relative to the vehicle's body or can have internal vibrations relative to different parts of the liftgate. Stabilization of the liftgate is important to reduce undesirable noise of the vehicle and wear on the liftgate and vehicle body. To stabilize the liftgate, the liftgate should be prevented from traveling cross-vehicle, fore/aft, and vertically during movement and vibration of the vehicle body and liftgate. Various components of the liftgate (e.g. speakers, inner or outer panels) should be prevented from moving relative to other proximate components (e.g. inner or outer panel). Prior attempts at stabilizing the liftgate involved draft angles and geometry that required separate parts to be mounted to the liftgate. These additional parts increase the time and cost of assembling the liftgate.

Conventionally constructed liftgates that include taillights typically have a set of taillight cans into which the taillights are mounted. Conventional taillights require a taillight can of a significant depth. To achieve such a depth, conventionally constructed liftgates require taillight cans that are separately stamped parts, as the depth and draft angles are too severe for stamping into the inner panel. These separate taillight cans are subsequently mounted to the liftgate and seal with the outer panel of the liftgate to prevent liquid from getting between the inner and outer panels. These separate taillight cans add cost and time to the manufacturing process.

SUMMARY

In accordance with an aspect of the present disclosure a liftgate for a vehicle includes an inner panel and an outer header panel. The inner panel includes a header member, a pair of supports, at least one stiffener, and a lower section. The header member has a top edge and a bottom edge. The pair of supports extends from opposite ends of the header member. The supports and the bottom edge of the header member partially define a window aperture. The stiffener is coupled to the header member between the top and bottom edges and between the opposite ends of the header member. The lower section has a pair of side portions and a base portion. Each side portion is coupled to a respective one of the supports. The base portion spans between the side portions. The outer header panel is mounted to the header member to define a header cavity between the header member and the outer header panel. The stiffener protrudes from the header member into the header cavity and is fixed to the outer header panel.

In accordance with an aspect of the present disclosure the outer header panel is fixed to the stiffener by an adhesive.

In accordance with an aspect of the present disclosure the stiffener includes a shelf surface that is spaced apart from the header member and is fixed to a middle portion of the outer header panel.

In accordance with an aspect of the present disclosure the stiffener is integrally formed with the header member.

In accordance with an aspect of the present disclosure the liftgate includes a beltline member. The side portions and the base portion defining a generally "U" shaped aperture. The "U" shaped aperture opening into the window aperture. The beltline member spans between the side portions across a top of the "U" shaped aperture to partially define the window aperture.

In accordance with an aspect of the present disclosure the beltline member is adapted to mount a wiper assembly.

In accordance with an aspect of the present disclosure each of the side portions has a fore face and defines a speaker housing. The speaker housing has a mounting face that is offset in a fore direction from the fore face and adapted to mount a speaker.

In accordance with an aspect of the present disclosure each of the side portions have an aft face and defining a taillight can. The taillight can has a side wall and a back wall. The sidewall offsets the back wall in a fore direction from the aft face. The taillight can is adapted to receive a taillight.

In accordance with an aspect of the present disclosure the taillight can has a profile length "L5" and a distance "L4". L5 includes the length of two opposing portions of the sidewall and the length of a portion of the back wall that is between the opposing portions of the sidewall, and L4 is the distance between the opposing portions of the sidewall, wherein a relationship between L4 and L5 is defined by 100*(L5 −L4)/L4>20%.

In accordance with an aspect of the present disclosure the relationship between L4 and L5 is defined by 100*(L5−L4)/L4>50%.

In accordance with an aspect of the present disclosure a method of forming a liftgate for a vehicle includes the step of heating a quantity of a first metal until the first metal is in a molten state. The method includes injecting the first metal in a molten state into a set of dies. The method includes flowing the first metal in a molten state between the dies. The method includes solidifying the first metal in the dies to form a liftgate inner panel that has an upper section and a lower section. The upper section includes a header member and a pair of supports extending from opposite ends of the header member to partially define a window aperture. The lower section is coupled to the upper section by the supports and defines a pair taillight cans that have a side wall and a back wall. The sidewall offsets the back wall in a fore direction from an aft face of the lower section In accordance with an aspect of the present disclosure the taillight can has a profile length "L5" and a distance "L4". L5 includes a length of two opposing portions of the sidewall and a length of a portion of the back wall that is between the opposing portions of the sidewall. L4 is the distance between the opposing portions of the sidewall. A relationship between L4 and L5 is defined by 100*(L5 −L4)/L4>20%.

In accordance with an aspect of the present disclosure the relationship between L4 and L5 is defined by 100*(L5−L4)/L4>50%.

In accordance with an aspect of the present disclosure the method includes the step of mounting an outer header panel to the header member to define a header cavity between the header member and the outer header panel. The header member includes at least one stiffener that protrudes into the header cavity. The method includes affixing the stiffener to the outer header panel.

In accordance with an aspect of the present disclosure the step of affixing the stiffener to the outer header panel includes applying an adhesive to the stiffener or the outer header panel.

In accordance with an aspect of the present disclosure the stiffener includes a shelf surface that is spaced apart from the header member and the step of affixing the stiffener to the outer header panel includes fixing the shelf surface to a middle portion of the outer header panel.

In accordance with an aspect of the present disclosure the step of solidifying the first metal in the dies includes integrally forming the stiffener with the header member.

In accordance with an aspect of the present disclosure the method includes forming a beltline member separately from the inner panel. The lower section defines a generally "U" shaped aperture. The "U" shaped aperture opens into the window aperture. The method includes the step of mounting the beltline member across a top of the "U" shaped aperture to partially define the window aperture.

In accordance with an aspect of the present disclosure the lower section defines a speaker housing. The speaker housing has a mounting face that is offset in the fore direction from a surrounding fore face of the lower section.

In accordance with an aspect of the present disclosure the first metal is magnesium.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is perspective view of a vehicle that has a liftgate in accordance with the present teachings;

FIG. 8 is a sectional view of the taillight can of FIG. 7;

FIG. 9 is a sectional view of a portion of the inner panel of FIG. 2, showing a lower bridge of a first construction integrally formed in the inner panel;

DETAILED DESCRIPTION

Figure 2:
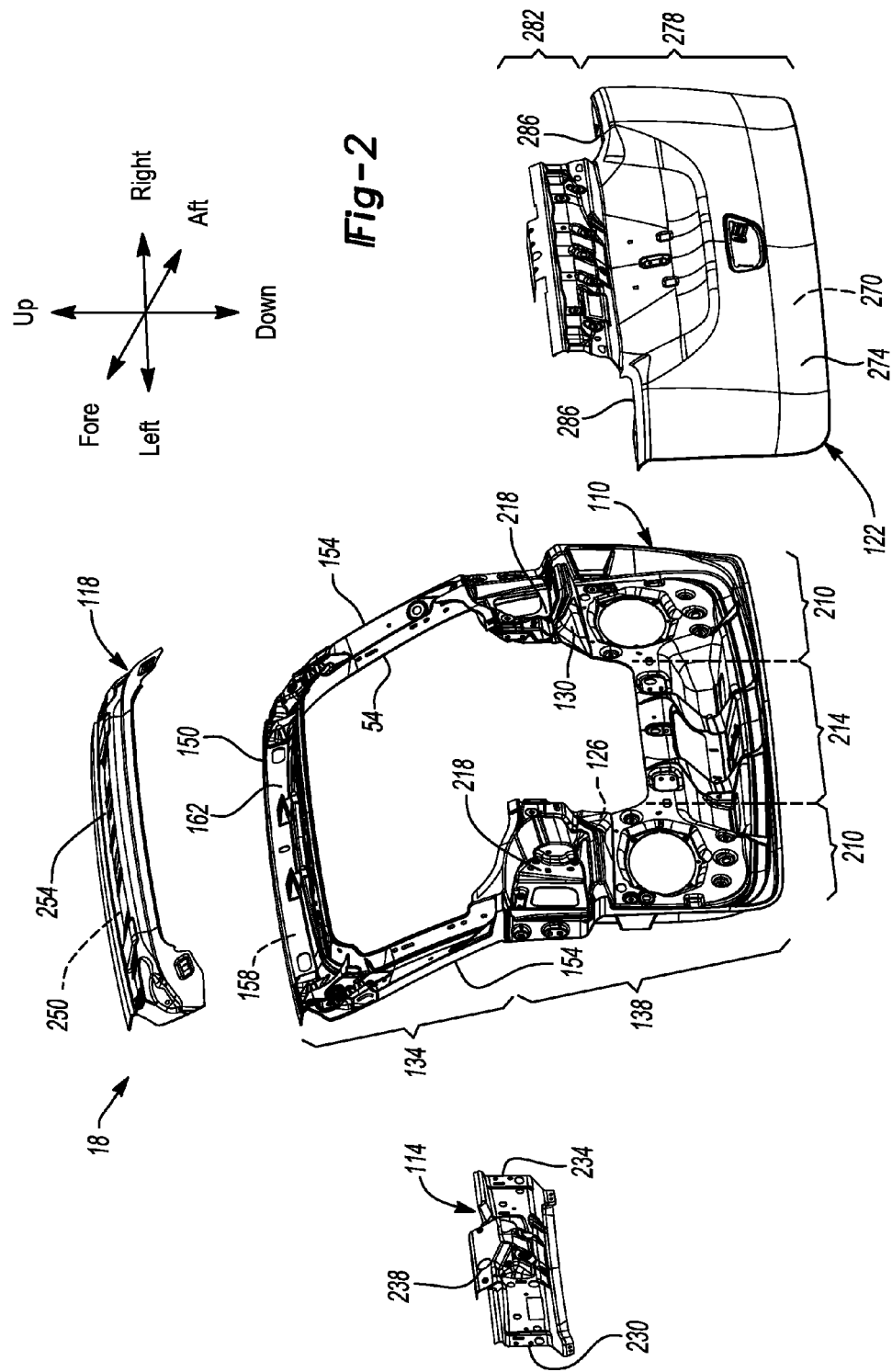
FIG. 2 is an exploded view of the liftgate of FIG. 1 showing an inner panel of the liftgate.

The present disclosure is directed toward a liftgate design for a vehicle that permits the inner panel to be die cast from a metal material, such as magnesium, while having a decreased rear window envelope and flow-through areas of the inner panel having nominal wall thicknesses of equal to or less than 2 mm. It will be appreciated that the liftgates of the present disclosure can be formed from any other suitable material and/or may have nominal wall thicknesses of more or less than 2 mm. In one example, the liftgate of the present disclosure has a nominal wall thickness of 2.3 mm or less.

With reference to FIG. 1, a vehicle 10 is shown having a vehicle body 14 and a flip-up style rear door or liftgate 18 in a closed position. The vehicle 10 has a rear window pane 22, a pair of outer taillights 26, a pair of inner taillights 30, and a wiper assembly 34. The vehicle body 14 includes a roof 38 and defines a rear opening 42 that permits access to the vehicle's 10 passenger compartment and/or trunk area (not specifically shown) when the liftgate 18 is in an open position (not shown). The liftgate 18 closes the rear opening 42 to inhibit access to the passenger compartment and/or trunk area when in the closed position. The liftgate 18 is coupled to the vehicle body 14 such that the liftgate 18 pivots about an axis 50 via a hinge (not shown) that is located proximate to the roof 38.

The liftgate 18 includes a window aperture 54. The rear window pane 22 is mounted to the liftgate 18 to cover the window aperture 54 while permitting sight from the passenger compartment and/or trunk area, to the exterior of the vehicle 10. The outer taillights 26 are mounted to the vehicle body 14 on opposite (e.g. left and right) sides of the rear opening 42 and generally terminate at the rear opening 42. The inner taillights 30 are mounted to the liftgate 18 on opposite sides of the liftgate 18, such that each of the inner taillights 30 is adjacent to and generally aligned with one of the outer taillights 26 when the liftgate 18 is in the closed position. The inner taillights 30 generally terminate at the periphery of the liftgate 18. The inner taillights 30 are positioned below the rear window pane 22. The wiper assembly 34 is mounted to the liftgate 18 and includes a blade 58 and a motor (not shown). The motor is coupled to the blade 58 to rotate or move the blade 58 in a conventional manner. In the example provided, the wiper assembly 34 is mounted to the liftgate above the inner taillights 30 and through the rear window pane 22, though other configurations can be used.

With additional reference to FIG. 2, the liftgate 18 is shown in greater detail. The liftgate 18 includes an inner panel 110, a beltline panel 114, an outer header panel 118, and an outer lower panel 122. The inner panel 110 is a single piece, unitarily formed body. The inner panel 110 is formed in a single, die-casting process and is a metal, such as magnesium. The beltline panel 114, outer header panel 118, and outer lower panel 122 are each individual parts that are formed separately from the inner panel 110. The inner panel 110 has a fore face 126 and an aft face 130. The inner panel 110 has an upper section 134 and a lower section 138 that provide the structure and shape of the liftgate 18. In the example provided, the liftgate 18 has a generally rectangular overall shape when viewed from a front or rear view (e.g. FIGS. 3 and 4), and the liftgate 18 is angled in the fore direction at a juncture of the upper and lower sections 134, 138 of the inner panel 110.

The upper section 134 includes a header member 150 and a pair of vertical supports 154. The header member 150 is disposed along the top of the inner panel 110 proximate to the roof 38 of the vehicle 10 and is coupled to the vehicle body 14 or roof 38 by the hinge (not shown). The header member 150 has a fore face 158 and an aft face 162. The vertical supports 154 join the lower section 138 of the inner panel 110 to the header member 150. The vertical supports 154 extend between the header member 150 and the lower section 138 at an angle relative to the lower section 138, such that the header member 150 and lower section 138 are offset in the fore/aft directions. The vertical supports 154 are disposed on opposite (e.g. left and right) sides of the inner panel 110 to partially define the shape of the liftgate 18. The vertical supports 154 space the lower section 138 apart from the header member 150, such that the vertical supports 154, header member 150, and lower section 138 partially define the window aperture 54. The header member 150 is described in greater detail below with reference to FIGS. 12 and 13.

The lower section 138 is a generally "U" shaped structure including a pair of side portions 210 that form the sides of the "U" shape, and a base portion 214 that forms the bottom of the "U" shape. Each of the side portions 210 is connected to one of the vertical supports 154 at a upper end of the side portion 210 (i.e. the end that is distal to the base portion 214) to join the upper and lower sections 134, 138. Each side portion 210 defines a taillight can 218 proximate to each upper end of the side portion 210 and disposed above the base portion 214. The lower section 138 is described in greater detail below with reference to FIGS. 3 and 4.

The beltline panel 114 is a separately formed structure that is mounted to the lower section 138 of the inner panel 110 by any suitable means, such as rivets, welds, or bolts for example. In the example provided, the beltline panel 114 is press molded or stamped from a steel or aluminum sheet. In an alternative construction, the beltline panel 114 is die-cast separately from the inner panel 110. Left and right sides 230, 234 of the beltline panel 114 are coupled to a respective one of the side portions 210 of the lower section 138 proximate to the upper ends of the side portions 210. The beltline panel 114 spans across the top of the lower section 138 to close the "U" shape and to define a portion of the window aperture 54. Thus, the beltline panel 114, header member 150, upper ends of the side portions 210, and vertical supports 154 define the window aperture 54. The beltline panel 114 includes a mount (not specifically shown) and a wiper aperture 238. The motor (not shown) is connected to the mount and disposed on a fore side of the beltline panel 114, proximate to the passenger compartment and/or trunk area. A shaft member (not shown) extends through the wiper aperture 238 and is drivingly coupled to the blade 58 to rotate the blade 58.

The outer header panel 118 is a separately formed structure that is mounted to the header member 150 by any suitable means, such as rivets, welds, crimping, or bolts for example. In the example provided, the outer header panel 118 is press molded or stamped from a steel or aluminum sheet, though it is understood that other materials or constructions can be used. The outer header panel 118 has a fore face 250 and an aft face 254. The fore face 250 opposes the aft face 162 of the header member 150 when mounted to the header member 150. The aft face 254 of the outer header panel 118 faces toward the exterior of the vehicle 10 and may be a Class A surface prepared or painted to be visible from the exterior of the vehicle.

The outer lower panel 122 is a separately formed structure that is mounted to the lower section 138 of the inner panel 110 by any suitable means, such as rivets, welds, crimping, or bolts for example. In the example provided, the outer lower panel 122 is press molded or stamped from a steel or aluminum sheet, though it is understood that other materials or constructions can be used. The outer lower panel 122 has a fore face 270 and an aft face 274. The fore face 270 opposes the aft face 130 of the lower section 138 of the inner panel 110. The aft face 274 of the outer lower panel 122 faces exterior of the vehicle 10 and may be a Class A surface prepared or painted to be visible from the exterior of the vehicle. The outer lower panel 122 has a shape that substantially covers the lower section 138 of the inner panel 110, generally excluding the taillight cans 218, such that the aft face 130 of the lower section 138 of the inner panel 110 is hidden by the inner taillights 30, the window pane 22, and the outer lower panel 122 when viewed from the exterior of the vehicle 10. The outer lower panel 122 has a first area 278, a second area 282, and a pair of flanges 286. The first area 278 spans across the lower section 138, below the taillight cans 218. The second area 282 extends up from the first area 278, between the taillight cans 218. The second area 282 covers the beltline panel 114 to border the rear window pane 22. The flanges 286 extend slightly into a respective one of the taillight cans 218 as described below and shown with reference to FIG. 9.

Figure 3:
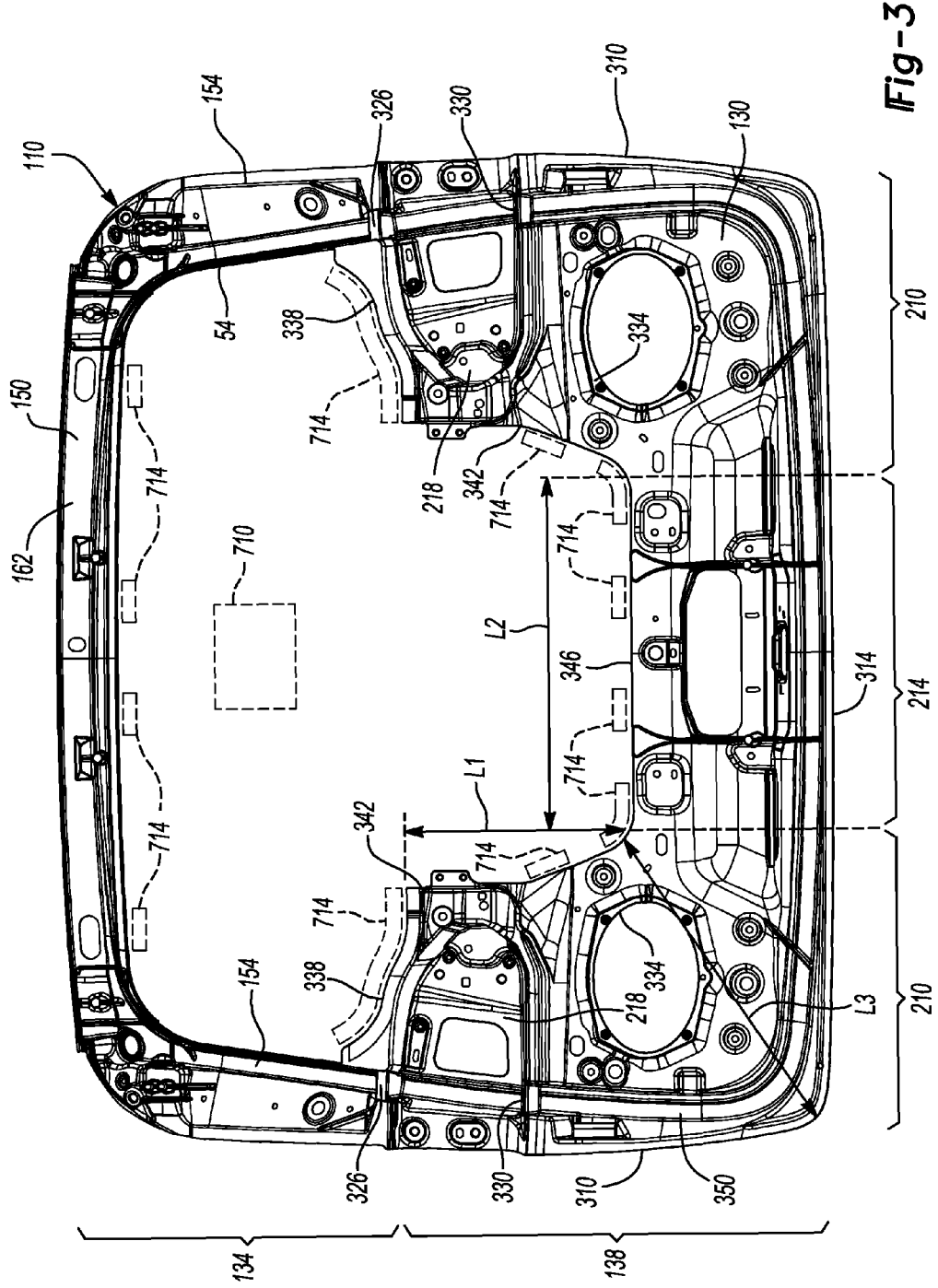
FIG. 3 is an elevated view of an aft side of the inner panel of FIG. 2.
Figure 4:
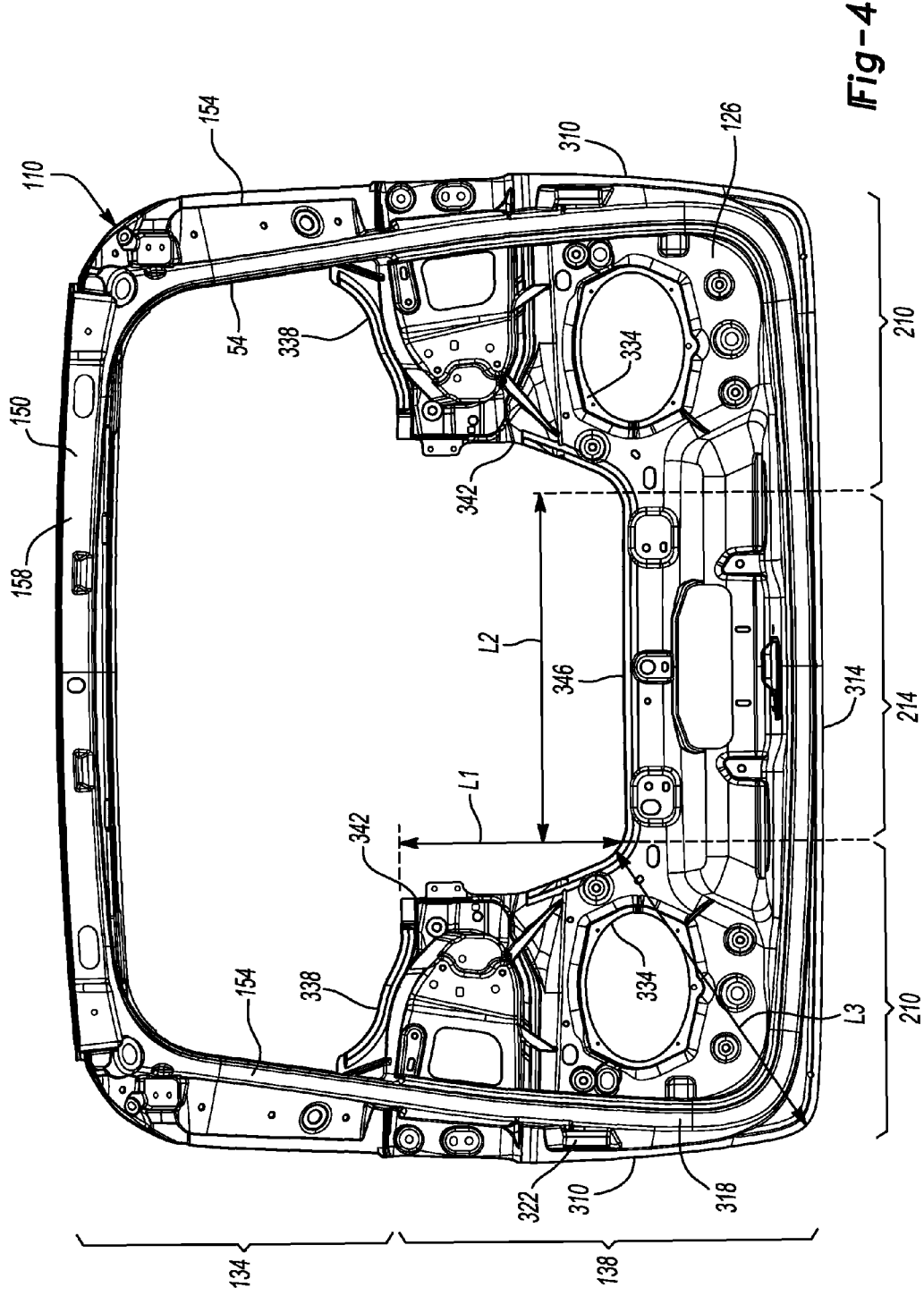
FIG. 4 is an elevated view of a fore side of the inner panel of FIG. 2.

With additional reference to FIGS. 3 and 4, the lower section 138 of the inner panel 110 is described in greater detail. The lower section 138 has a generally rectangular shape when viewed from the fore or aft directions, with a pair of outer edges 310 joined by a bottom edge 314 that form the periphery of the lower section 138. The lower section 138 includes a rim 318 (FIG. 4) that extends vertically along the sides and horizontally along the bottom of the lower section 138, proximate to the periphery of the lower section 138 and offset interior of the outer and bottom edges 310, 314. The rim 318 contacts weather stripping (not shown) on the vehicle body 14 around the rear opening 42 to seal the passenger compartment and/or trunk area from the exterior of the vehicle 10.

The lower section 138 further includes a pair of stability shoulders 322 (FIG. 4), a pair of upper bridges 326 (FIG. 3), a pair of lower bridges 330 (FIG. 3), and a pair of speaker housings 334. The upper end of each side portion 210 includes a first edge 338 that extends generally inward from each vertical support 154 toward the middle of the liftgate 18 (e.g. in the right direction for the left side portion 210 and in the left direction for the right side portion 210) to partially define the bottom border of the window aperture 54. Each side portion 210 includes a second edge 342 that extends generally downward from the first edge 338 to form an interior side of the "U" shape. The base portion 214 includes a third edge 346 that extends in the left and right directions between the second edges 342 to form an interior bottom of the "U" shape. The second edge 342 extends downward a vertical length L1 and the third edge 346 extends across the lower section 138 a horizontal length L2. The horizontal length L2 may be greater than the vertical length L1, such that the bottom of the "U" shape is wider than the height of the sides of the "U" shape. The base portion 214 may be configured such that the horizontal length L2 is longer than a maximum horizontal distance between each second edge 342 and the respective outer edge 310. The "U" shape is such that a maximum distance radially outward from the second or third edges 342, 346 is a length L3. Length L3 is the maximum distance that molten metal must flow through the dies from any particular gate 710 during the casting process, which is described in greater detail below. This maximum distance may be described by an equation where L3 is less than or equal to 200*T, where T is equal to the nominal wall stock thickness of the inner panel 110 in millimeters. In the example provided, the nominal wall stock thickness is 2 mm and L3 is approximately 400 mm.

Figure 5:
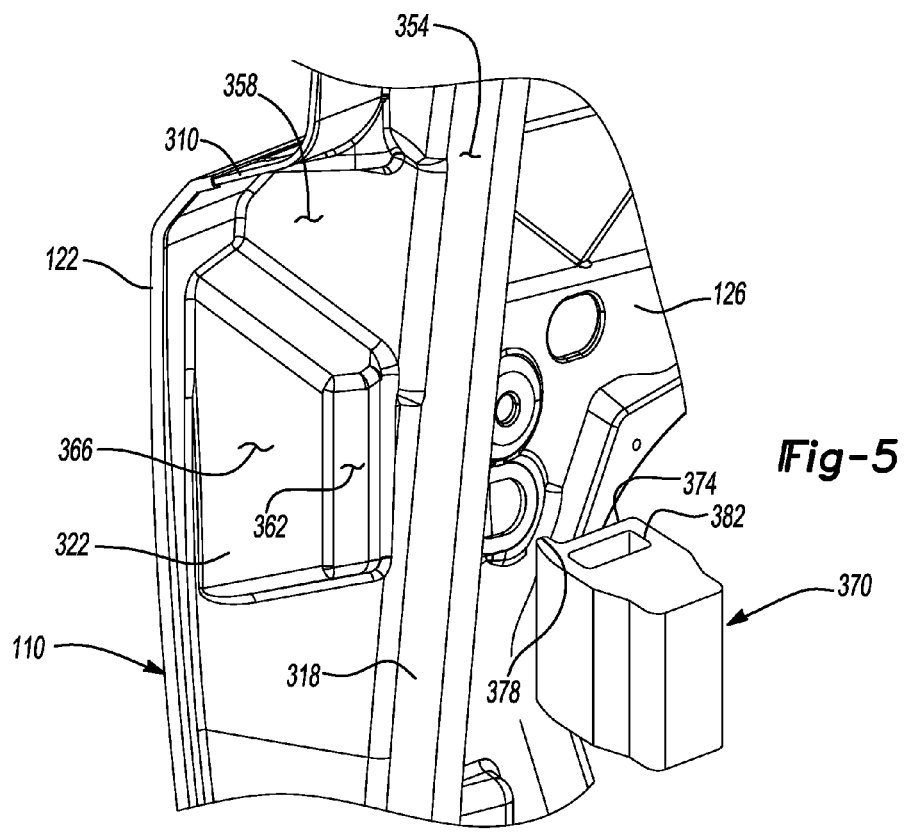
FIG. 5 is a perspective of a portion of the fore side of the inner panel of FIG. 2, showing a stability shoulder of the inner panel and a shuffle bumper.
Figure 6:
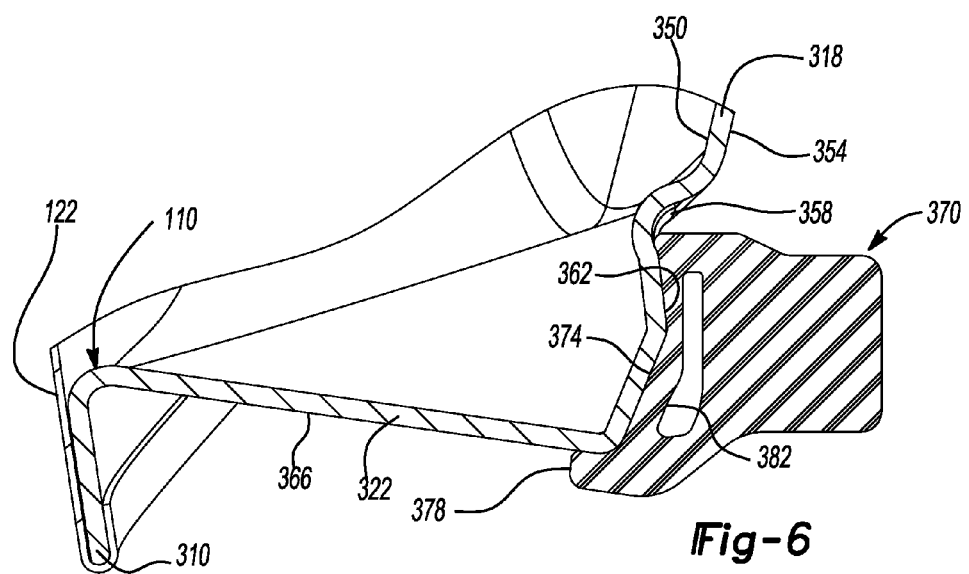
FIG. 6 is a sectional view of the stability shoulder and shuffle bumper of FIG. 5.

With additional reference to FIGS. 5 and 6, the rim 318 has a generally "U" shaped cross-section, with the tops of the "U" shape extending from the surrounding fore face 126 of the inner panel 110 to offset the bottom of the "U" shape from the surrounding fore face 126 in the fore direction. Thus the rim 318 forms a trough 350 in the aft face 130 and a protrusion in the fore face 126 of the inner panel 110. The rim 318 has a first rim surface 354 and a second rim surface 358. The first rim surface 354 faces in the fore direction and the second rim surface 358 extends from the first rim surface 354 in the aft direction. The second rim surface 358 faces outward toward the outer edge 310 (e.g. in the right and left directions for the left and right sections of the rim 318 respectively). The stability shoulders 322 are located approximately midway along the length of each outer edge 310 and are formed into or protrude from the second rim surface 358, between the rim 318 and the outer edge 310. The stability shoulder 322 has a first shoulder surface 362 and a second shoulder surface 366. The first shoulder surface 362 is offset in the aft direction from the first rim surface 354 and extends outward from the second rim surface 358. The second shoulder surface 366 is offset in the outward direction from the second rim surface 358. Those of skill in the art will appreciate that the first shoulder surface 362, second shoulder surface 366, first rim surface 354, second rim surface 358, and outer edge 310, are formed at angles that cannot be formed by stamping a single sheet of material. The first and second shoulder surfaces 362, 366 are configured to abut against a shuffle bumper 370 when the liftgate 18 is in the closed position.

The shuffle bumper 370 is a resilient member formed from rubber for example, that is mounted to the vehicle body 14. The shuffle bumper 370 includes a first bumper surface 374 and a lip 378. The first bumper surface 374 abuts against the first shoulder surface 362. The lip 378 extends in the aft direction from the outer side of the first bumper surface 374 to abut against the second shoulder surface 366. The shuffle bumper 370 has a cavity 382 that permits the shuffle bumper 370 to compress when the liftgate 18 is moved from the open position to the closed position. The compression of the shuffle bumper 370 biases the first bumper surface toward the first shoulder surface 362 to remain in contact with the first shoulder surface 362 and inhibit vibration of the liftgate 18 in the fore/aft direction. The respective lips 378 of the left and right shuffle bumpers 370 inhibit vibration of the liftgate 18 in the respective left/right directions.

Figure 7:
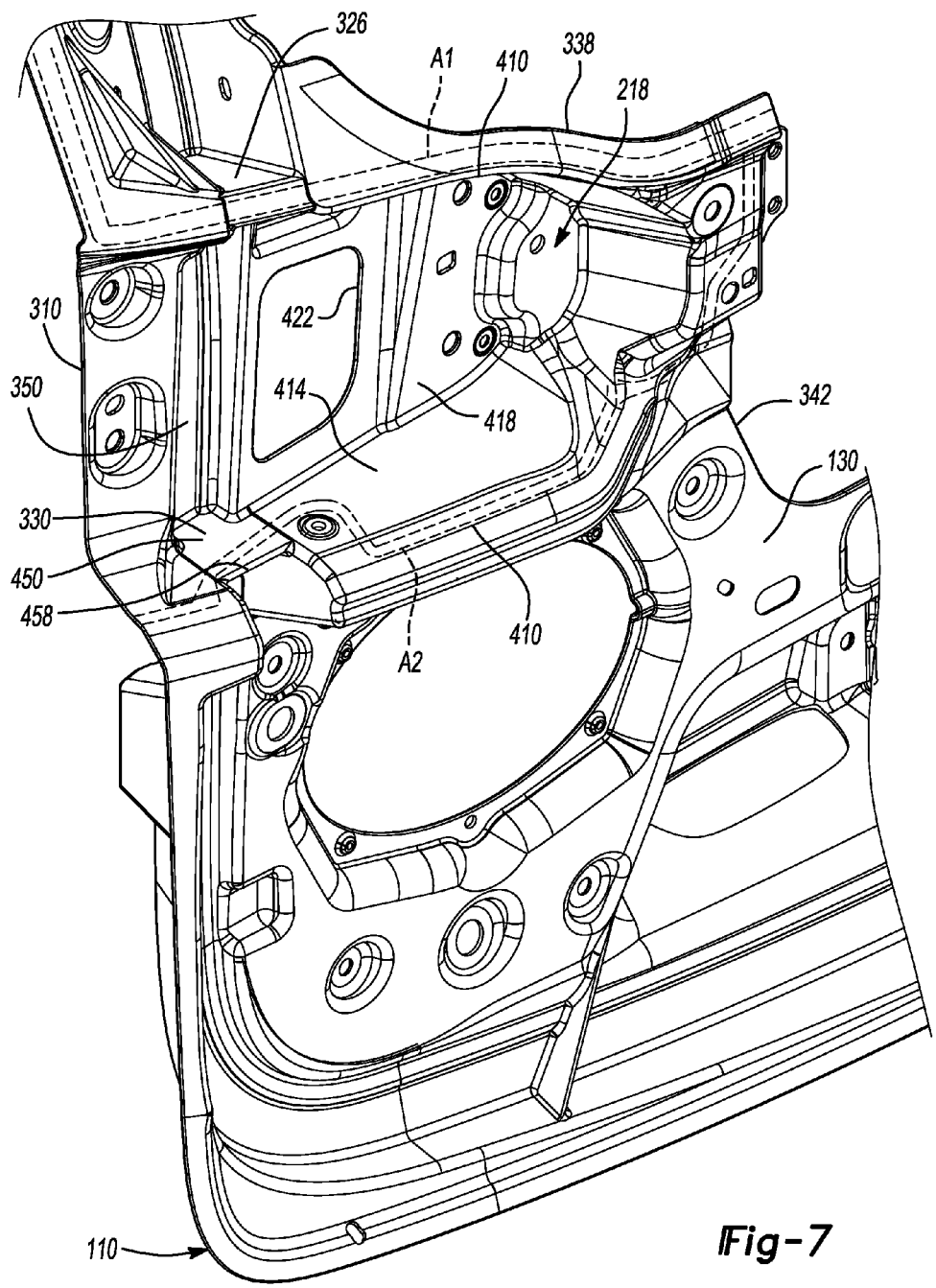
FIG. 7 is a perspective view of a portion of the inner panel of FIG. 2, showing a taillight can integrally formed in the inner panel.

With additional reference to FIGS. 7-9, each taillight can 218 is embossed into the aft face 130 of the lower section 138. The taillight can 218 has an outer periphery 410, a side wall 414, a back wall 418, and an aperture 422 for permitting power cables (not shown) or a portion of the inner taillights 30 to pass through the inner panel 110. The side wall 414 protrudes in the fore direction from the outer periphery 410 and the surrounding area of the aft face 130 of the inner panel 110. The outer periphery 410 and side wall 414 form a generally sideways "U" shape, such that the tops of the "U" shape are open to and terminate at the outer edge 310 of the lower section 138. The side wall 414 terminates in the fore direction at the back wall 418. The distance across the taillight can 218 between the top and bottom or opposite sides of the outer periphery 410 is denoted by L4 and the length of the taillight can's 218 profile, i.e. along each side wall 414 and the back wall 418 from the opposite sides of the outer periphery 410, is denoted by L5. The taillight can 218 may be embossed into the aft face 130, such that 100*(L5−L4)/L4 is at least greater than 20%. In the example provided L4 and L5 are such that 100*(L5−L4)/L4 is greater than 53%. Those of skill in the art will appreciate that such a taillight can 218 cannot be unitarily formed into a liftgate inner panel by a traditional stamping of a single sheet of steel or aluminum, as the sheet would stretch and break due to the inability to feed additional material from the area surrounding the taillight can 218 into the area of the stamp tooling that would form the taillight can 218. Those of skill in the art will appreciate that the additional material would be prevented from being fed into the area of the stamp tooling that would form the taillight can 218 due to the surrounding material being clamped by the stamp tooling in order to form the features that surround the taillight can 218.

The portions of the outer periphery 410 and the side wall 414 that form the upper side of the "U" shape includes the upper bridge 326 that spans across the trough 350 of the rim 318. The upper bridge 326 is a solid body of metal having a cross-sectional area that fills a length of the trough 350 to be flush with the surrounding aft face 130 of the inner panel 110. The length of the trough 350 that is filled by the upper bridge 326 is sufficient to apply a first bonding material (not shown). The first bonding material is applied to a first area or bonding surface A1 that extends around the window aperture 54 and along the top of the outer periphery 410 of the taillight can 218. In the example provided, the first bonding material seals the rear window pane 22 to the inner panel 110 in some areas and to a portion of the outer lower panel 122 in others to inhibits liquid from entering the space between the inner panel 110 and the rear window pane 22 or between the inner panel 110 and the outer lower panel 122. In the example provided, the first bonding material is a glass urethane material.

The portion of the side wall 414 that forms the lower side of the "U" shape includes the lower bridge 330 that spans across the trough 350 of the rim 318. The lower bridge 330 is a wedge shaped, solid body of metal having a first side 450, a second side 454, and a tip 458. The first side 450 forms a portion of the side wall 414 and is flush with the surrounding portions of the side wall 414. The first and second sides 450, 454 converge to join at the tip 458. The lower bridge 330 has a cross-sectional area such that the tip 458 does not extend to the outer periphery 410 of the taillight can 218. In this way, the trough 350 causes a break in the outer periphery 410 proximate to the bottom of the taillight can 218, but only a partial break in the side wall 414. The flange 286 of the outer lower panel 122 extends in the fore direction partially into the taillight can 218 along the outer periphery 410. The flange 286 has an extension 462 that extends inward from the outer periphery 410 and along the side wall 414 to cover the break in the side wall 414 caused by the trough 350 and lower bridge 330. A second bonding material (not shown), such as a pumpable adhesive for example, is applied to a second area or bonding surface A2 along the outer periphery 410, the lower side wall 414 and up the aft face 130 to intersect with the first area A1. The second bonding material seals the flange 286 of the outer lower panel 122 to the inner panel 110 to inhibit liquid from entering the space between the inner panel 110 and the outer lower panel 122. In this way, the taillight cans 218 are unitarily formed in the inner panel 110, while the space between the inner panel 110 and the outer lower panel 122 remains a dry environment.

In an alternate construction, not specifically shown, the upper bridge 326 is constructed in a similar manner to the lower bridge 330 described above. In this construction, the upper bridge 326 does not extend to the outer periphery 410 of the taillight can 218. In this way, the trough 350 causes a break in the outer periphery 410 proximate to the top of the taillight can 218, but only a partial break in the side wall 414. In this construction, a Class A surface seals along the first area A1 and includes an upper extension (not shown) that is similar to the extension 462. The upper extension extends inward from the outer periphery 410 and along the side wall 414 to cover the break in the side wall 414 caused by the trough 350 and upper bridge 326 and seals on a portion of the side wall 414 and the upper bridge 326 similar to the extension 462.

Figure 10:
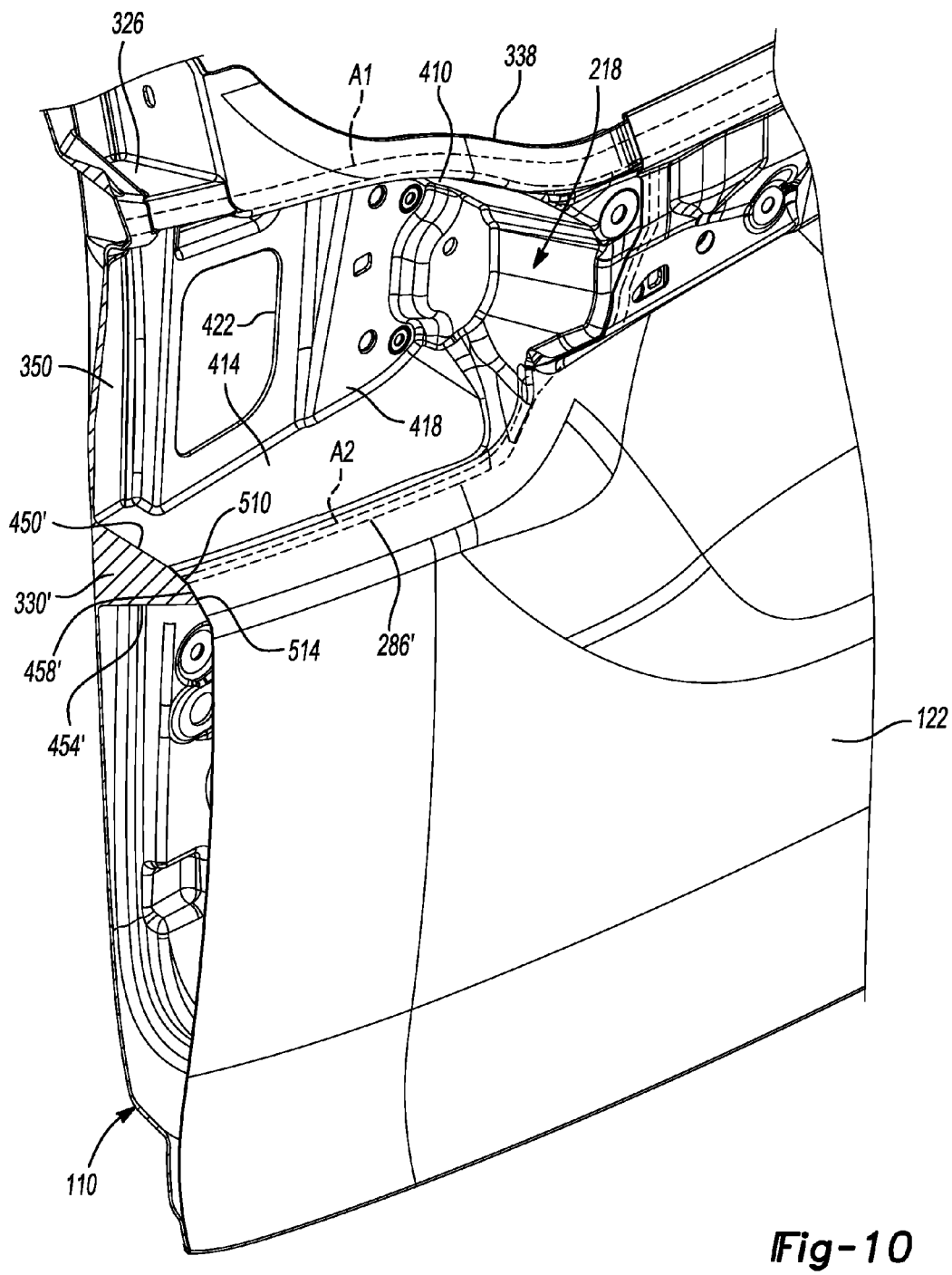
FIG. 10 is a sectional view similar to FIG. 9, showing a lower bridge of a second construction integrally formed in the inner panel.

With reference to FIG. 10, a lower bridge 330' and flange 286' of a second construction are shown. The lower bridge 330' and flange 286' are similar to the lower bridge 330 and flange 286 with the exceptions shown in FIG. 10 and described herein. The tip 458' of the lower bridge 330' has a first flat surface 510 and a second flat surface 514 formed at angles relative to the first and second sides 450', 454' of the lower bridge 330'. The tip 458' extends to the outer periphery 410 and forms a portion of the outer periphery 410. The flange 286' does not include the extension 462 to overlap with the side wall 414 and instead, seals along the outer periphery 410 including at least one of the first and second flat surfaces 510, 514 of the lower bridge 330'.

Figure 11:
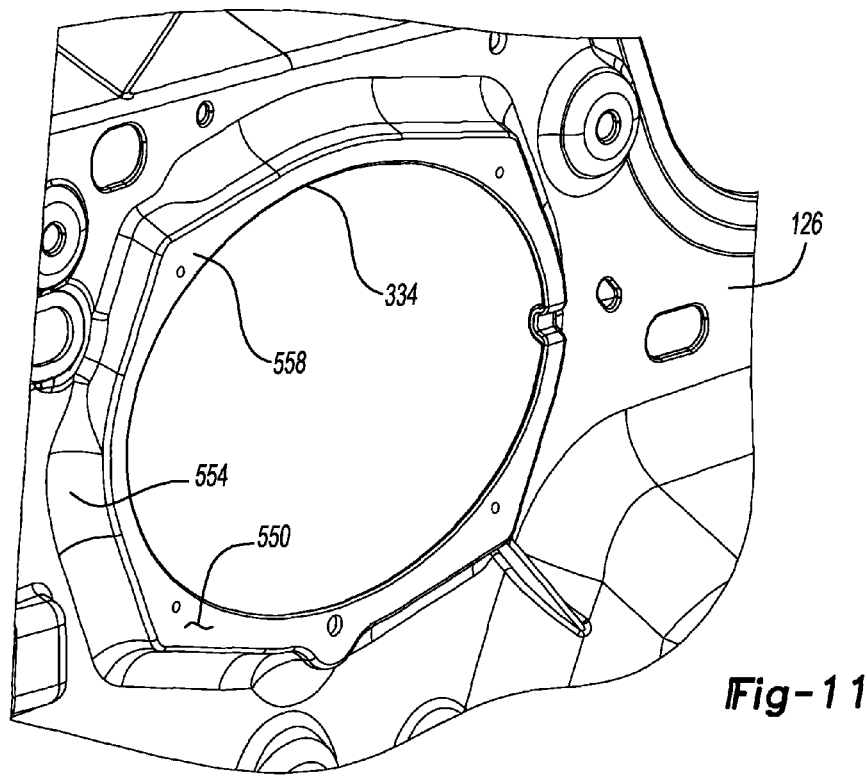
FIG. 11 is a perspective view of a portion of the fore side of the inner panel of FIG. 2, showing a speaker housing of the inner panel.

With additional reference to FIG. 11, each speaker housing 334 is formed into one of the side portions 210 of the inner panel 110, below the taillight can 218. The speaker housing 334 is disposed partially above and partially below the third edge 346 of the base portion 214. The speaker housing 334 includes a plateau surface 550 that is offset in the fore direction from the fore face 126 of the inner panel 110 by a plateau wall 554. The plateau wall 554 is formed at a depth and draft angle relative to the fore face 126 and the plateau surface 550 such that the speaker housing 334 could not be unitarily formed with the inner panel 110 from a stamping of a single sheet of material. The plateau surface 550 includes a plurality of speaker mounting holes 558. A speaker (not shown) is mounted in the speaker housing 334. The plateau wall 554 supports the plateau surface 550 to prevent the speaker from pumping the lower section 138 and producing undesired vibrations in the inner panel 110.

Figure 12:
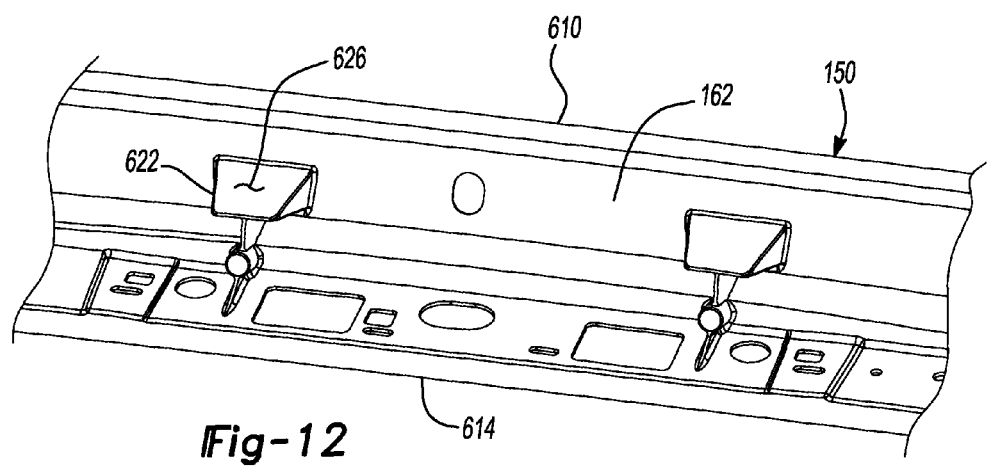
FIG. 12 is a perspective view of a portion of the aft side of the inner panel of FIG. 2, showing a stiffener of a header portion of the inner panel.
Figure 13:
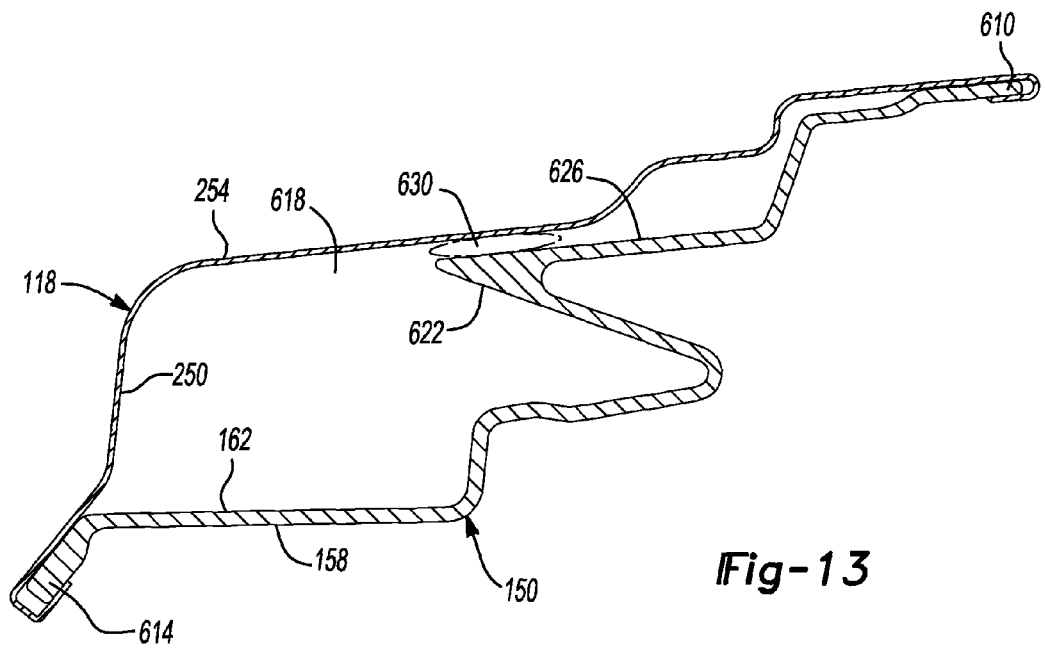
FIG. 13 is a sectional view of the header portion and stiffener of FIG. 12, showing an outer header panel of the liftgate.

With additional reference to FIGS. 12 and 13, the header member 150 is described in greater detail. The header member 150 has an outer edge 610 that extends along the top of the header member 150 and an inner edge 614 that extends along the bottom of the header member 150. The outer header panel 118 is attached to the header member 150 at the outer and inner edges 610, 614. The outer header panel 118 is spaced apart from the header member 150 between the outer and inner edges 610, 614 to define a header cavity 618. The header member 150 includes at least one stiffener 622. The stiffener 622 is a hollow wedge shaped protrusion formed in the header member 150 between the outer and inner edges 610, 614. The stiffener 622 can alternatively be other shapes such as a rectangular protrusion (not specifically shown) for example. The stiffener 622 protrudes from the header member 150 in the aft direction into the header cavity 618. The stiffener does not extend the entire length of the header member 150 and is located between the ends of the header member 150 that are coupled to the vertical supports 154. The stiffener 622 includes a shelf surface 626. The shelf surface 626 is coupled to a middle portion of the outer header panel 118 by an adhesive 630 placed between the shelf surface 626 and the fore face 250 of the outer header panel 118. The middle portion of the outer header panel 118 is the portion of the outer header panel 118 that is between the outer and inner edges 610, 614 and partially defines the header cavity 618. The stiffener 622 provides structural support to the outer header panel 118 to prevent pumping relative to the inner panel 110 during vibration of the liftgate 18. In the example provided, the header member 150 includes two stiffeners 622, equally spaced apart from a center of the header member 150.

Figure 14:
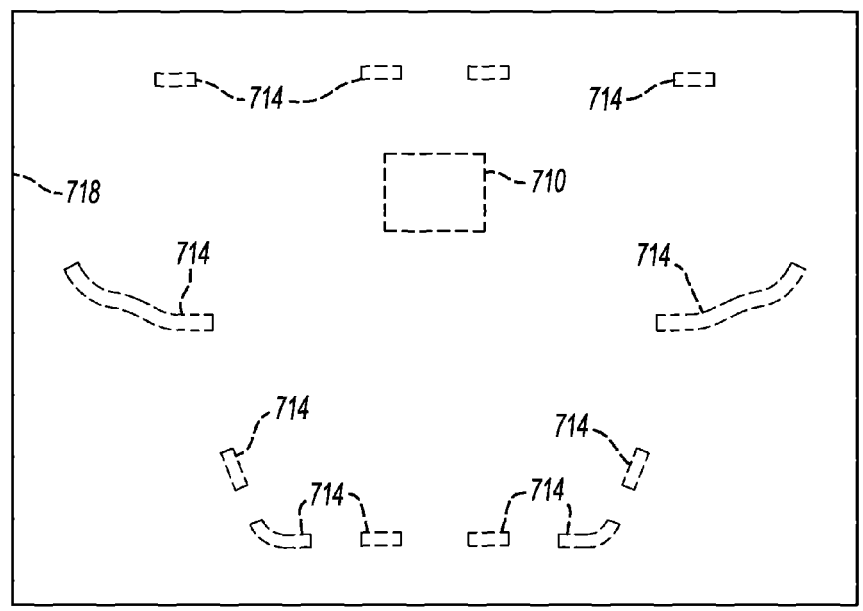
FIG. 14 is a schematic view of a set of die-cast dies showing a plurality of gates used in forming the inner panel of FIG. 2.

In manufacturing the liftgate 18, the inner panel 110 is formed by a die-casting process. With additional reference to FIG. 14, an amount of magnesium is heated until molten, then injected through a sprue 710 and a plurality of gates 714 (also shown in FIG. 3) of a platen (not specifically shown) and a set of dies 718. Those of skill in the art will appreciate that the set of dies 718 include two dies (only one of which is schematically shown) that have a pair of opposing faces (not shown) that are substantially the negative of the inner panel 110. The gates 714 are connected to the sprue 710 by a plurality of pathways (not shown) to deposit the molten metal within the dies 718 along the window aperture 54 and second and third edges 342, 346. In the example provided, there are four gates 714 along the header member 150, one gate along each first edge 338, one gate along each second edge 342, two gates along the third edge 346, and one gate 714 at the juncture of each second edge 342 and the bottom edge 346.

Pressure is applied to the molten metal entering the dies 718 such that the molten metal travels radially outward from the gates 714, through the dies 718 until the dies 718 are filled with molten metal. The gates 714 are positioned such that the molten metal does not need to travel a distance greater than L3, i.e. 200 times the nominal wall stock thickness. The dies 718 are heated to minimize premature solidification of the molten metal. The dies 718 may have a surface texture or roughness having a depth of approximately 0.003 inches and a draft angle of 4.5°, which gives the inner panel 110 a similar, mating surface texture. In the example provided, the surface texture is on the opposing faces of both of the dies 718. The surface texture of the dies 718 decreases the surface tension of the flowing molten metal to improve flow through areas of the dies 718 including areas that are a nominal thickness of 2 mm or less. The molten metal then solidifies in the dies 718 and the inner panel 110 is ejected therefrom.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate for a vehicle, the liftgate comprising:
a unitarily cast inner panel including:
   a header member having a top edge and a bottom edge;
   a pair of supports extending from opposite ends of the header member, the supports and the bottom edge of the header member partially defining a window aperture;
   at least one stiffener coupled to the header member and disposed between the top and bottom edges and between the opposite ends of the header member; and
   a lower section having a pair of side portions and a base portion, each side portion being coupled to a respective one of the supports, the base portion spanning between the side portions; and
an outer header panel mounted to the header member to define a header cavity between the header member and the outer header panel;
wherein the stiffener protrudes from the header member into the header cavity and is fixed to the outer header panel within the header cavity.

2. The liftgate of claim 1, wherein the outer header panel is fixed to the stiffener by an adhesive.

3. The liftgate of claim 1, wherein the stiffener includes a shelf surface that is spaced apart from the header member and is fixed to a middle portion of the outer header panel.

4. The liftgate of claim 3, wherein the stiffener is integrally formed with the header member.

5. The liftgate of claim 1, further comprising:
a beltline member;
wherein the side portions and the base portion define a generally "U" shaped aperture, the "U" shaped aperture opening into the window aperture; and
wherein the beltline member spans between the side portions across a top of the "U" shaped aperture to partially define the window aperture.

6. The liftgate of claim 1, wherein the inner panel is magnesium.

7. The liftgate of claim 1, wherein each of the side portions has a fore face and defines a speaker housing, the speaker housing having a mounting face that is offset in a fore direction from the fore face and adapted to mount a speaker.

8. The liftgate of claim 1, wherein each of the side portions has an aft face and defines a taillight can, wherein the taillight can has a side wall and a back wall, the sidewall offsetting the back wall in a fore direction from the aft face, wherein the taillight can is adapted to receive a taillight.

9. The liftgate of claim 8, wherein the taillight can has a profile length "L5" and a distance "L4", wherein L5 includes a length of two opposing portions of the sidewall and the length of a portion of the back wall that is between the opposing portions of the sidewall, and L4 is the distance between the opposing portions of the sidewall, wherein a relationship between L4 and L5 is defined by 100*(L5−L4)/L4>20%.

10. The liftgate of claim 9, wherein the relationship between L4 and L5 is defined by 100*(L5−L4)/L4>50%.

11. A method of forming a liftgate for a vehicle, the method comprising:
heating a quantity of a first metal until the first metal is in a molten state;
injecting the first metal in a molten state into a set of dies;
flowing the first metal in a molten state between the dies;
solidifying the first metal in the dies to form a unitary cast liftgate inner panel that has:
   an upper section that includes a header member and a pair of supports extending from opposite ends of the header member to partially define a window aperture; and
   a lower section that is coupled to the upper section by the supports and defines a pair taillight cans that have a side wall and a back wall, the sidewall offsetting the back wall in a fore direction from an aft face of the lower section;
mounting an outer header panel to the header member to define a header cavity between the header member and the outer header panel, wherein the header member includes at least one stiffener that protrudes into the header cavity; and
affixing the stiffener to the outer header panel within the header cavity.

12. The method of claim 11, wherein the taillight can has a profile length "L5" and a distance "L4", wherein L5 includes a length of two opposing portions of the sidewall and a length of a portion of the back wall that is between the opposing portions of the sidewall, and L4 is the distance between the opposing portions of the sidewall, wherein a relationship between L4 and L5 is defined by 100*(L5−L4)/L4>20%.

13. The method of claim 12, wherein the relationship between L4 and L5 is defined by 100*(L5−L4)/L4>50%.

14. The method of claim 11, wherein the step of affixing the stiffener to the outer header panel includes applying an adhesive to the stiffener or the outer header panel.

15. The method of claim 11, wherein the stiffener includes a shelf surface that is spaced apart from the header member, wherein affixing the stiffener to the outer header panel includes fixing the shelf surface to a middle portion of the outer header panel.

16. The method of claim 11, wherein the step of solidifying the first metal in the dies includes integrally forming the stiffener with the header member.

17. The method of claim 11, further comprising:
   forming a beltline member separately from the inner panel;
   wherein the lower section defines a generally "U" shaped aperture, the "U" shaped aperture opening into the window aperture; and
   mounting the beltline member across a top of the "U" shaped aperture to partially define the window aperture.

18. The method of claim 11, wherein the lower section defines a speaker housing, the speaker housing having a mounting face that is offset in the fore direction from a surrounding fore face of the lower section.

19. The method of claim 11, wherein the first metal is magnesium.

\* \* \* \* \*